US006941964B1

(12) United States Patent
Hess et al.

(10) Patent No.: US 6,941,964 B1
(45) Date of Patent: Sep. 13, 2005

(54) SAFETY DEVICE FOR PROPANE TANKS

(76) Inventors: James Hess, 10 Thornton Ct., Souderton, PA (US) 18964; William Y. Potter, 343 Heatherfield Dr., Souderton, PA (US) 18964; Wendel Angel, 167 Kerry Lynn Ct., Williamstown, NJ (US) 08094

( * ) Notice: Subject to any disclaimer, the term of this patent is extended or adjusted under 35 U.S.C. 154(b) by 0 days.

(21) Appl. No.: 10/806,873

(22) Filed: Mar. 23, 2004

(51) Int. Cl.[7] ............................................. F16K 35/00
(52) U.S. Cl. .................... 137/1; 137/377; 137/382; 220/725
(58) Field of Search ............................... 137/382, 377, 137/1; 220/725

(56) References Cited

U.S. PATENT DOCUMENTS 6,119,718 A * 9/2000 Cappuccio .................. 137/382
6,817,482 B1 * 11/2004 Borter ........................ 137/382

* cited by examiner

Primary Examiner—Kevin Lee
(74) Attorney, Agent, or Firm—William H. Eilberg

(57) ABSTRACT

A safety device prevents access to the gas valve of a propane tank. The device includes a cup which fits over the valve, and a locking device for preventing the cup from being lifted from the valve. In some embodiments, the device includes a handle which allows the tank to be carried easily while the safety device is installed. In at least one embodiment, there is no handle. The device prevents children, and other unauthorized persons, from operating the valve, and thus prevents the accidental release of flammable gas.

19 Claims, 9 Drawing Sheets

SAFETY DEVICE FOR PROPANE TANKS

BACKGROUND OF THE INVENTION

The present invention provides an effective anti-tampering device, intended to fit onto propane tanks which are typically used in domestic applications such as heating and cooking.

Liquefied propane (LP) is commonly used as fuel for gas grills which are popular for outdoor cooking and barbecuing. LP tanks are also commonly found on mobile or manufactured homes, where they are used to supply flammable gas for use in heating and cooking. LP may also be used in conventional homes located in remote areas which are not served by natural gas utilities.

Many gas grills use 20-pound propane tanks, which are large enough to store a reasonable supply of fuel, but small enough to be carried by one person. These portable tanks may also be found on recreational vehicles or trailers. It is common to provide a pair of such 20-pound tanks for these vehicles.

It is very easy to ignite a gas grill. One must simply lift the hood of the grill, open the valve of the LP tank, turn on the gas knobs, and push an igniter button. The simplicity of this process creates a clear hazard, namely that children, in an effort to mimic their parents, may easily ignite a grill at an inappropriate time. If the hood of the grill is in the lowered position, igniting the grill may cause a catastrophic explosion.

Moreover, if the valve of the LP tank is accidentally left open, the area surrounding the grill could become saturated with propane gas, creating the potential for an explosion if the igniter is pushed, or if the gas comes into contact with a spark, or with a lighted match or cigarette. Similar concerns apply to LP tanks used with mobile or manufactured homes, or recreational vehicles.

Although there exist federal safety regulations governing the design of LP tanks, there appear to be no regulations requiring a safety device which prevents unauthorized opening of such tanks.

The present invention provides a safety device which prevents accidental or unintentional release of flammable gas from a propane tank. The device of the present invention, in its preferred embodiment, also provides a convenient means for carrying and transporting a propane tank.

SUMMARY OF THE INVENTION

The present invention comprises a safety device which prevents access to the gas valve of a propane tank. In its most basic form, the device includes a cup which is of a size sufficient to fit over the major portion of the valve, and means for locking the cup in place over the valve. The cup therefore prevents access to the valve, and makes it virtually impossible to release flammable gas accidentally.

In one preferred embodiment, the safety device includes two distinct pieces, namely a cross-member which holds the cup, and a handle portion. The cross-member has one end which engages the collar of the propane tank. The handle portion is threaded through a hole in the cross member, and also engages the collar. The shank of a lock is inserted through openings in a baffle forming part of the cross-member, thereby blocking movement of the handle portion and of the cross-member. The cup is therefore prevented from becoming dislodged from the valve. The handle portion includes a grip which facilitates easy transport of the tank.

In another embodiment, the handle portion is permanently affixed to the cross-member, and the cross-member has means, at either end, for engagement with the collar of the tank.

In another embodiment, the handle portion again includes a grip, but the handle portion is permanently affixed, such as by welding, to the cross-member. As before, the cross-member is still engaged, at both ends, with the collar of the tank, so as to lock the cup over the valve, thus preventing access to the valve.

In still another embodiment, the cup includes holes which allow the prongs of a U-shaped member to pass through. The prongs themselves have holes which can accommodate the shank of a lock, enabling the U-shaped member to be locked to the collar of the tank, or to the cup, or both. The prongs pass beneath the valve, and prevent the cup from being lifted off the valve. This embodiment does not include a handle.

The invention also includes the methods of securing a valve, as performed by installing the various embodiments described above.

The invention therefore has the primary object of enhancing the safety of propane tanks and the like, by providing a device for blocking access to the gas valve of such tanks when the tanks are not in use.

The invention has the further object of preventing children, or other unauthorized persons, from opening the valve of a propane tank.

The invention has the further object of providing a safety device, as described above, wherein the device includes a handle that permits the propane tank to be easily carried when the tank is locked.

The invention has the further object of providing a safety device that can be used with existing propane tanks, without modifying such tanks.

The invention has the further object of providing a method of blocking access to the gas valve of a propane tank when the tank is not in use.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
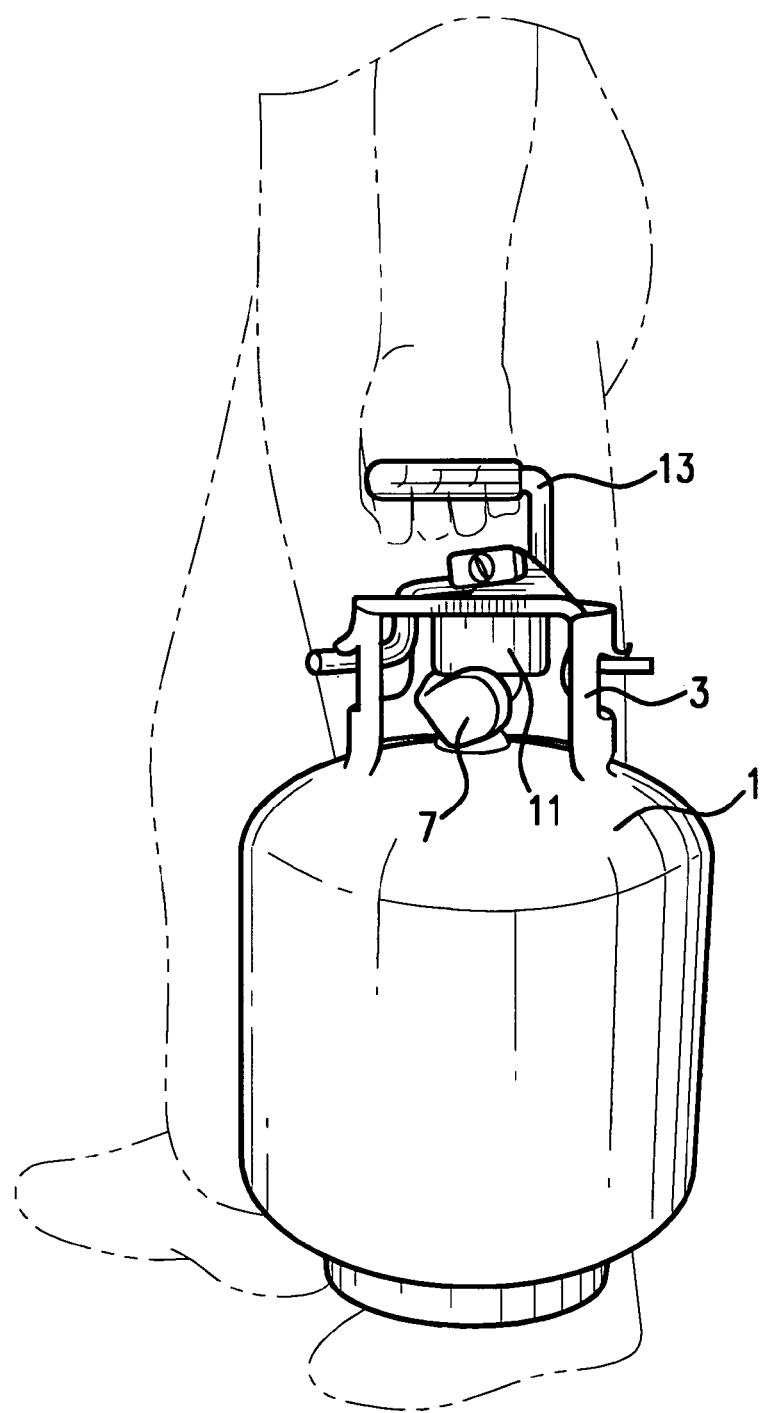
FIG. 1 provides a perspective view of a preferred embodiment of the present invention, showing the invention being used not only to prevent access to the valve of a propane tank, but also as a means of transporting the tank.
Figure 2:
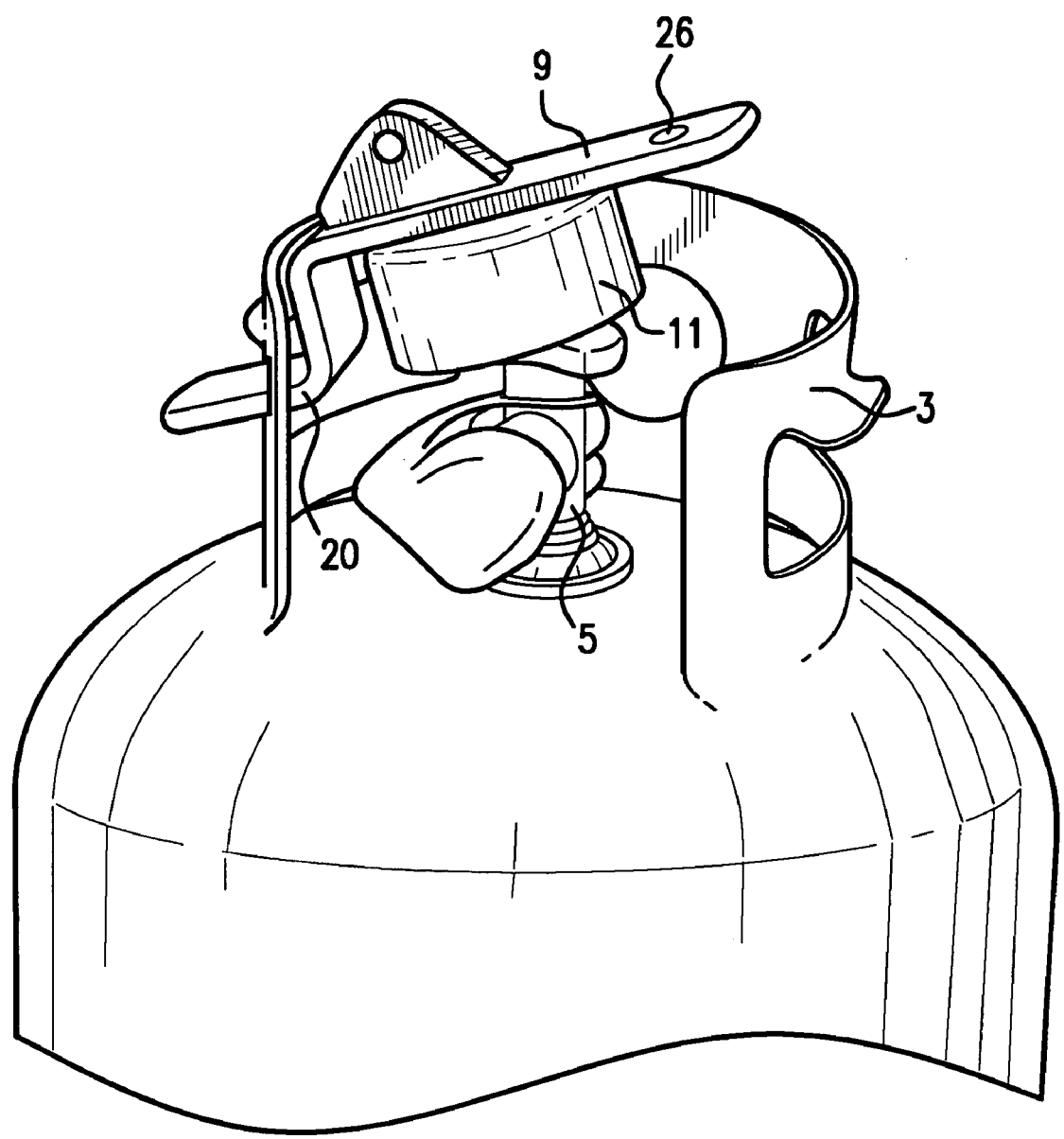
FIGS. 2–4 provide perspective views of the embodiment of FIG. 1, illustrating the steps of inserting the device of the invention over the valve of a propane tank, and locking the device onto the tank.
Figure 3:
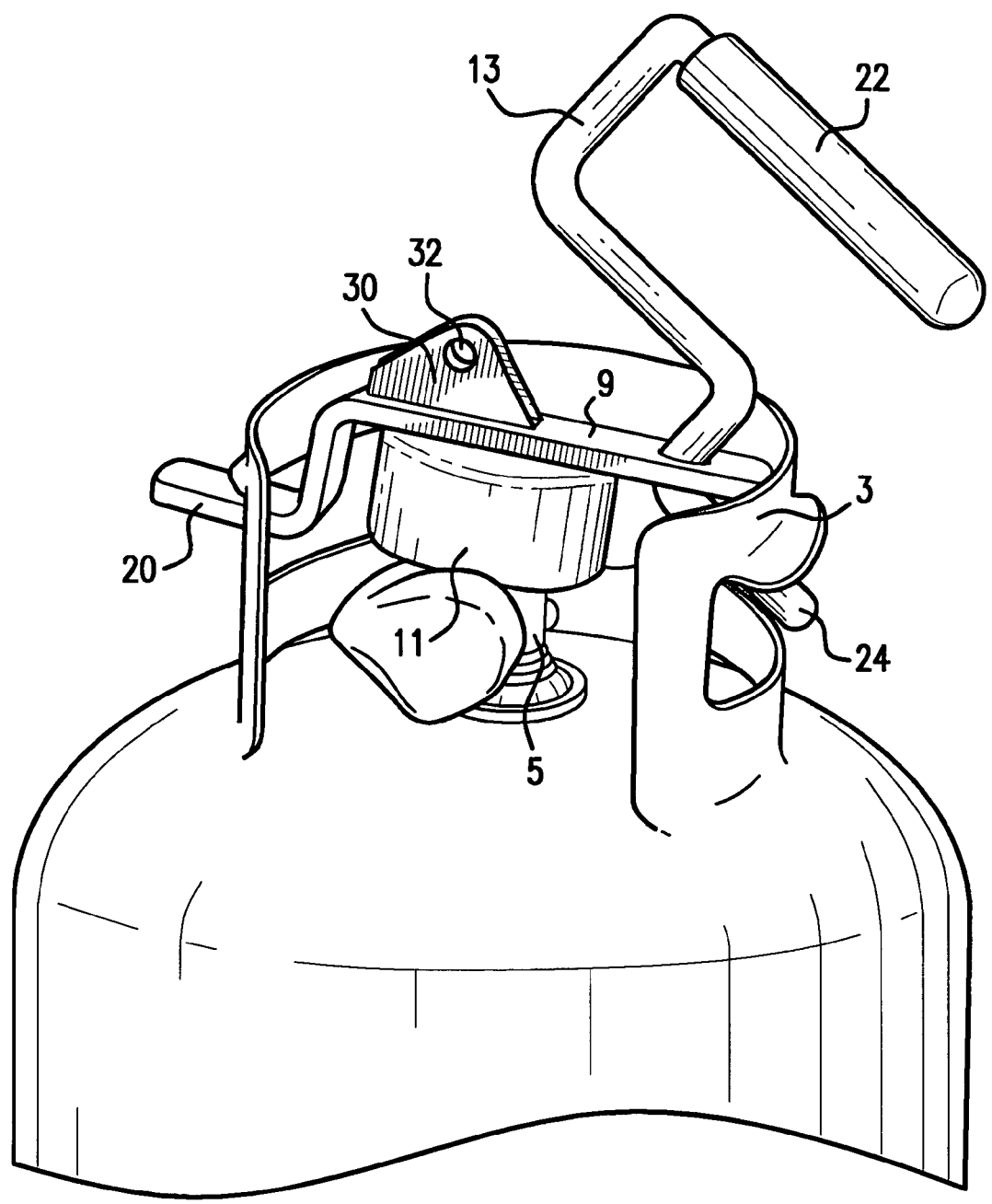
Figure 4:
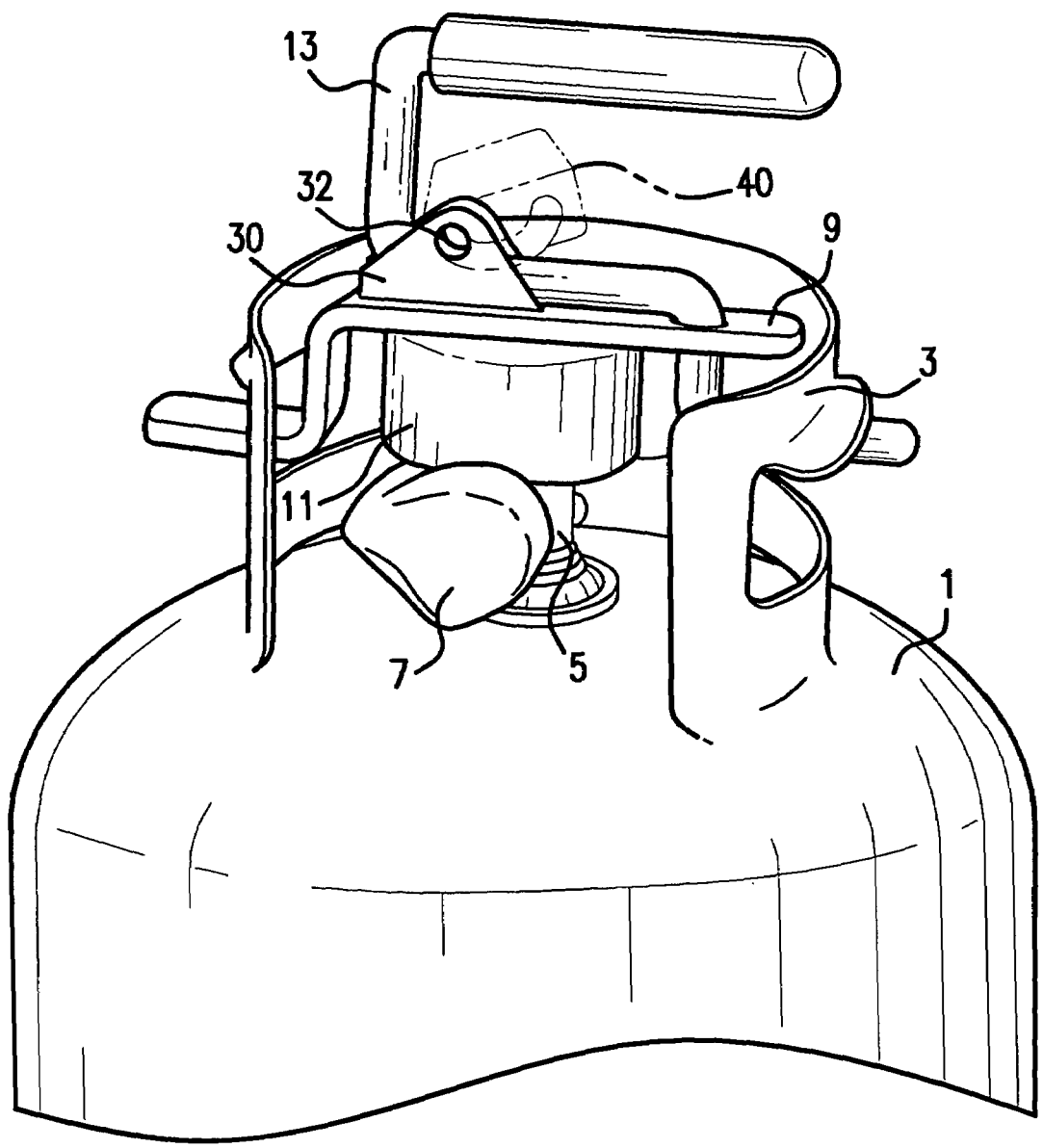

FIGS. 1–4 illustrate a first preferred embodiment of the present invention. FIG. 1 shows the safety device installed on a propane tank, and shows the tank being carried by the handle forming part of the safety device. FIGS. 2 and 3 show intermediate steps in the installation of this embodiment of the safety device. FIG. 4 provides a more detailed perspective view of the safety device as installed on a propane tank.

The safety device of the present invention is intended for use with propane tank 1 which has collar 3 which surrounds gas valve 5. The collar is a structure that forms part of the tank, and is not part of the present invention. The collar may be integrally formed with the tank, or it may be welded thereto. A protective cover 7, usually made of plastic, surrounds the valve, and is removed or partially released from the valve when the tank is in use. The cover 7 also does not form part of the present invention, but is typically supplied with the tank. In the drawings of this disclosure, the cover is shown in the partially released condition.

In the embodiment of FIGS. 1–4, the safety device comprises two distinct pieces. The first piece is a cross-member 9 which is attached to cup 11. The second is a handle portion 13 which attaches to the cross-member as described below, and as illustrated, for example, in FIG. 3.

FIG. 2 shows the cross-member 9 as it is being inserted over the gas valve 5. The cross-member includes L-shaped portion 20, which fits through an opening defined by the collar 3, so as to engage the collar. The cup 11 has a diameter and height sufficient to enclose a substantial portion, and preferably the major portion, of the valve 5, when the cross-member is inserted. The cross-member is sized such that the end opposite the L-shaped portion 20 does not extend beyond the collar. Thus, the entire cross-member, except for L-shaped portion 20, fits within the interior region bounded by the collar, as shown in FIG. 3. The cross-member also includes opening 26, visible in FIG. 2.

In FIG. 3, handle portion 13 is being inserted. The handle portion includes grip 22 at one end, and an L-shaped member 24 at the other end. The grip 22 may be made of foam or other equivalent material, to make it more comfortable to carry the tank in the manner illustrated in FIG. 1. The L-shaped member 24 of the handle portion 13 is threaded through opening 26 in cross-member 9, such that the distal end of the L-shaped member protrudes through another opening defined by the collar 3, opposite to the opening that receives L-shaped portion 20 of the cross-member. The handle portion 13 is threaded through opening 26 until it assumes the position shown in FIG. 4.

The cross-member also includes a pair of baffles 30, the baffles having holes 32 which are mutually aligned. The holes are spaced sufficiently away from the main body of the cross-member so as to enable the body of the handle to come to rest below the level of the holes, as shown in FIG. 4. A shank of lock 40 can therefore be attached through these holes, and will prevent upward movement of the handle. The lock thus prevents the handle portion 13 from being removed, and therefore also prevents the cross-member from being dislodged, because the cross-member is blocked by the handle portion. Thus, the cup 11 is effectively locked in place over the valve, and prevents access to the valve.

FIG. 1 shows the tank 1 being carried by handle portion 13, with the device of the present invention fully installed.

Figure 5:
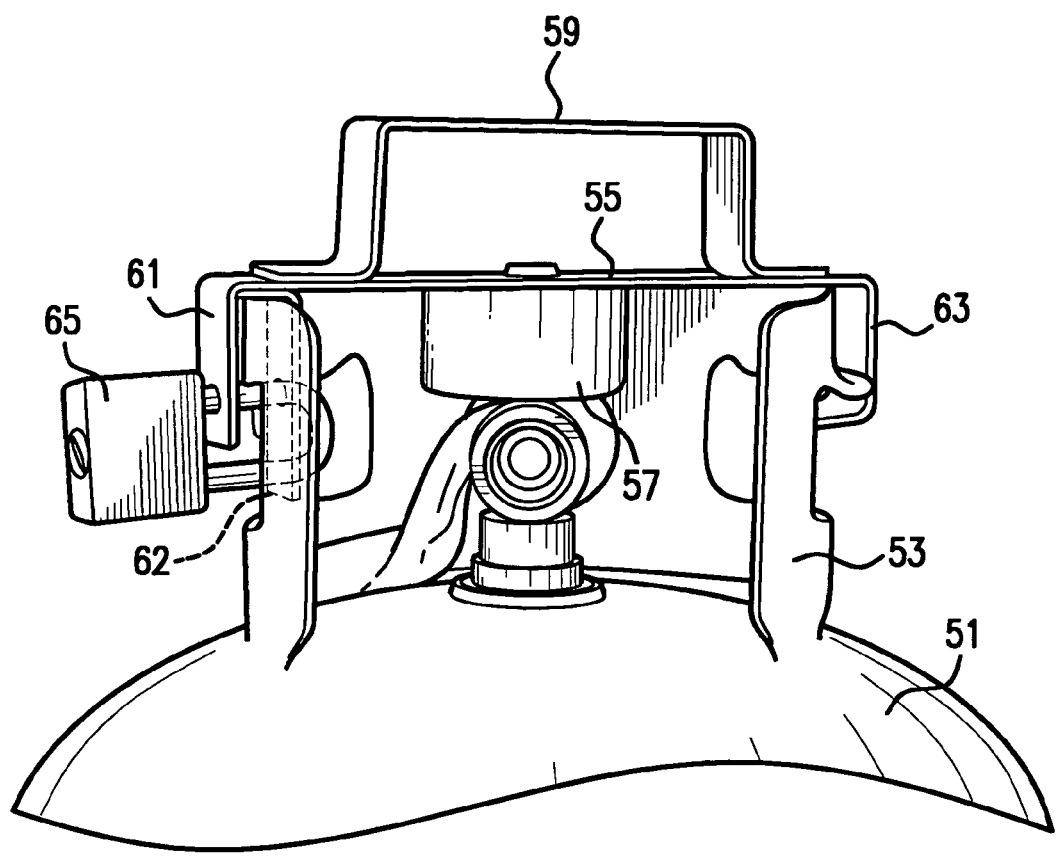
FIG. 5 provides a perspective view of another embodiment of the invention, wherein the locking device is formed of one piece.

FIG. 5 shows another embodiment of the invention. In this embodiment, the safety device comprises one piece. A propane tank 51 includes collar 53, as before. The safety device of this embodiment includes a cross-member 55 which is attached to cup 57. A handle portion 59 is attached to the cross-member. The cross-member includes, at one end, a pair of generally parallel members 61 and 62, generally perpendicular to the main body of the cross-member.

The parallel members 61 and 62 are intended to fit around the collar of the tank. In FIG. 5, member 62 is obscured by the collar of the tank, and is therefore shown in dotted outline.

The cross-member also includes a C-shaped structure 63 at the other end. The C-shaped structure enables the cross-member to engage a corresponding opening in the collar 53. Preferably, the C-shaped structure 63 includes an upwardly extending flange which causes the C-shaped structure to surround the collar, at least partially, and thereby to latch the C-shaped structure to the collar.

The parallel members 61 and 62 have holes which are mutually aligned, to allow a shank of lock 65 to pass through both holes, as well as through the opening in the collar, as shown in FIG. 5. When the lock is so installed, the end of the cross-member which has members 61 and 62 is thereby prevented from separating from the collar. At the same time, the other end of the cross-member remains firmly latched to the collar. Thus, the cross-member cannot move, and the cup 57 blocks access to the valve.

Like the first embodiment, the safety device according to the embodiment of FIG. 5 can be easily carried, in the locked position, simply by using the handle 59. The handle is preferably attached permanently to the cross-member, or is integrally formed therewith.

Figure 6:
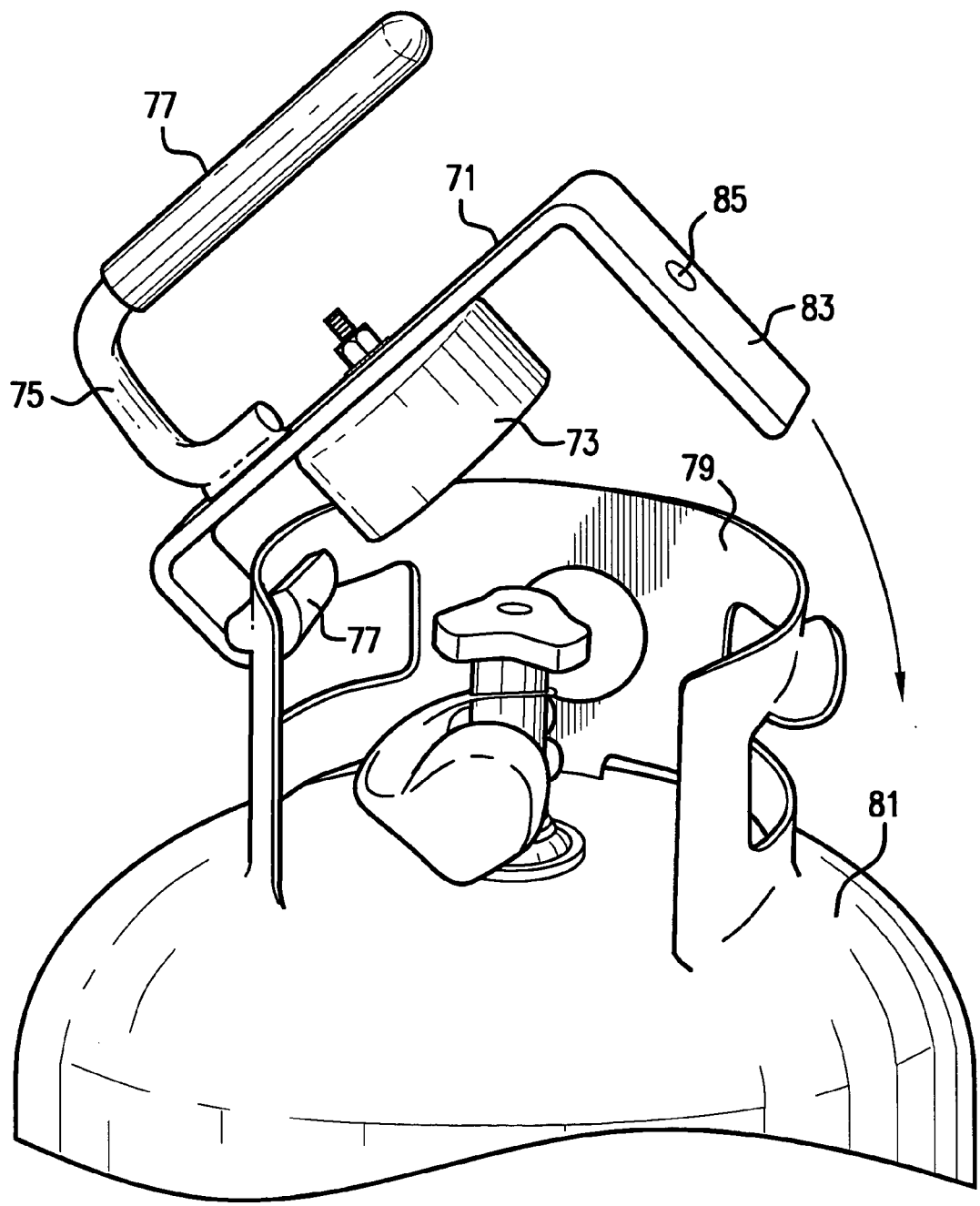
FIGS. 6 and 7 provide perspective views of another embodiment of the invention, wherein a handle is permanently welded to the main body of the device.
Figure 7:
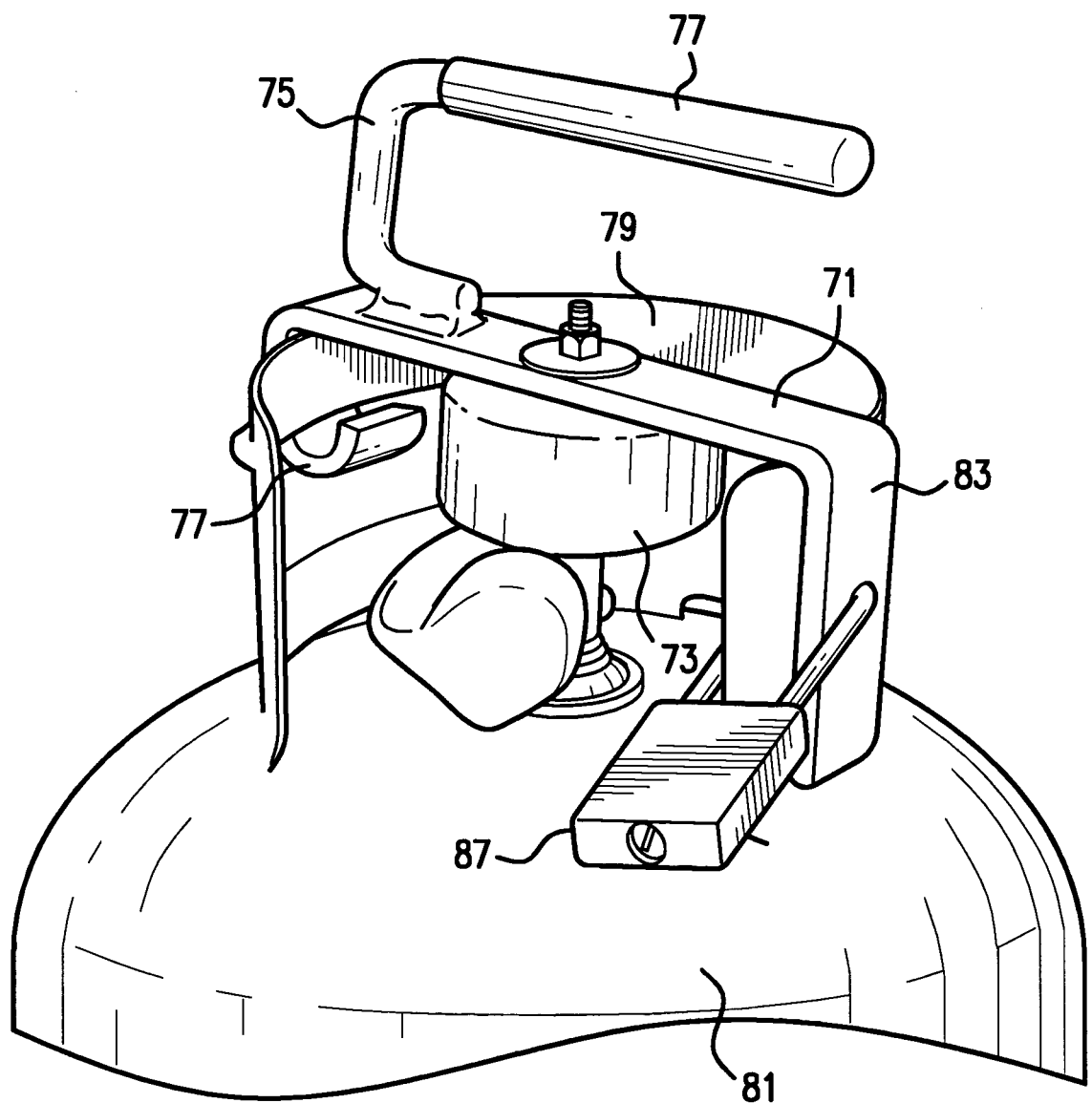

FIGS. 6 and 7 show another embodiment of the present invention. This embodiment is similar to that of FIGS. 1–4, except that the handle and the cross-member are essentially one piece. As shown in these figures, cross-member 71 is attached to cup 73. Handle 75, which includes a grip portion 77 is attached to the cross-member, such as by welding. Alternatively, the handle could be attached to the cross-member by other means, or it could be integrally formed with the cross-member.

One end of the cross-member comprises a C-shaped structure 77, suitable for engagement with collar 79 of propane tank 81, by passing through the opening in the collar. The other end 83 of the cross-member is L-shaped, and includes hole 85, which accommodates the shank of padlock 87. Thus, the cross-member includes means for engaging the collar at diametrically opposed locations. The lock is preferably attached such that the shank passes through hole 85, and also through the opening in the collar, while still enclosing a portion of the collar. In this way, the L-shaped end of the cross-member is locked to the collar, and the cup cannot move. Access to the valve is therefore blocked.

Figure 8:
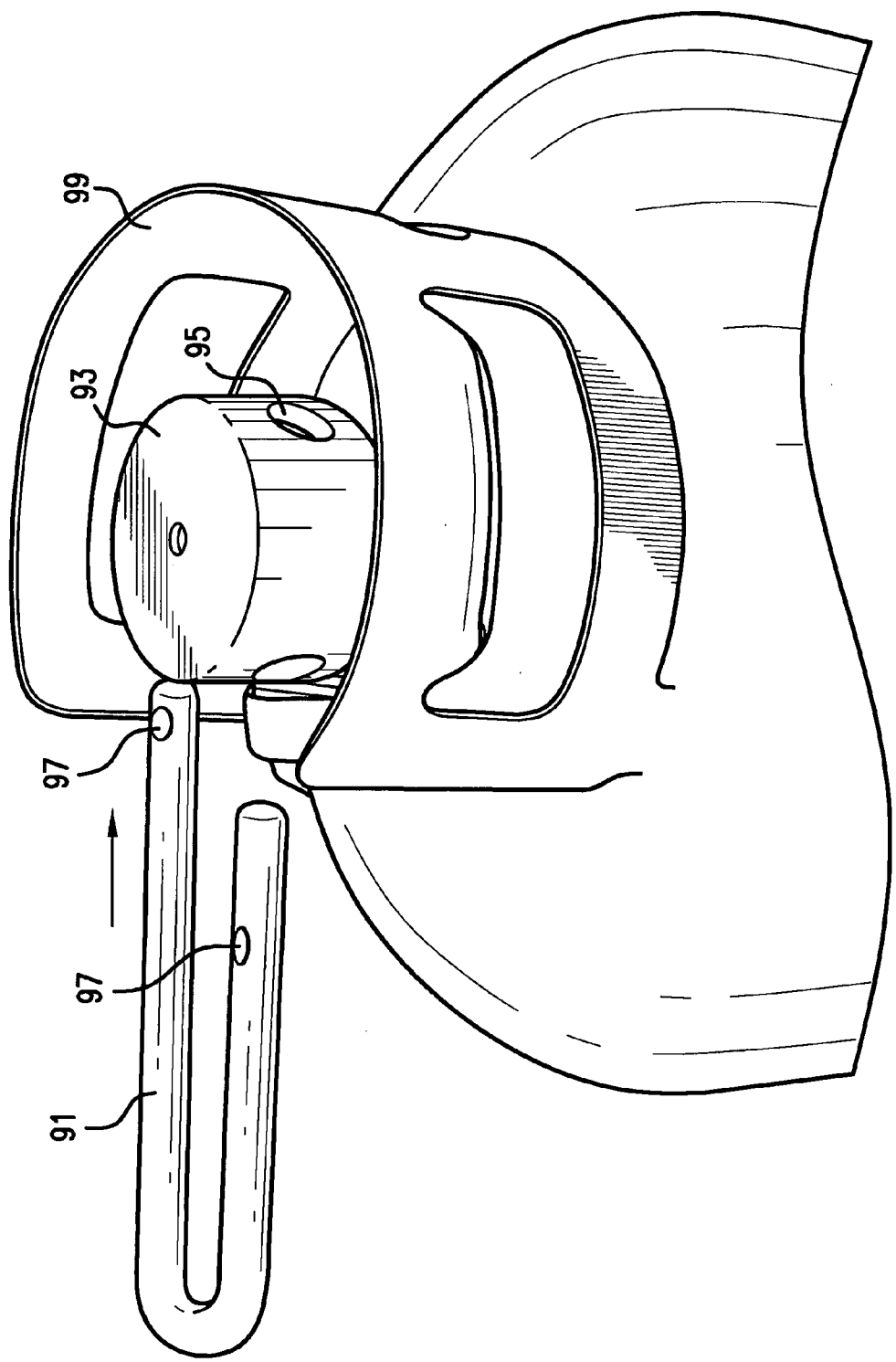
FIGS. 8 and 9 provide perspective views of another embodiment of the present invention, wherein the safety device does not include a handle.
Figure 9:
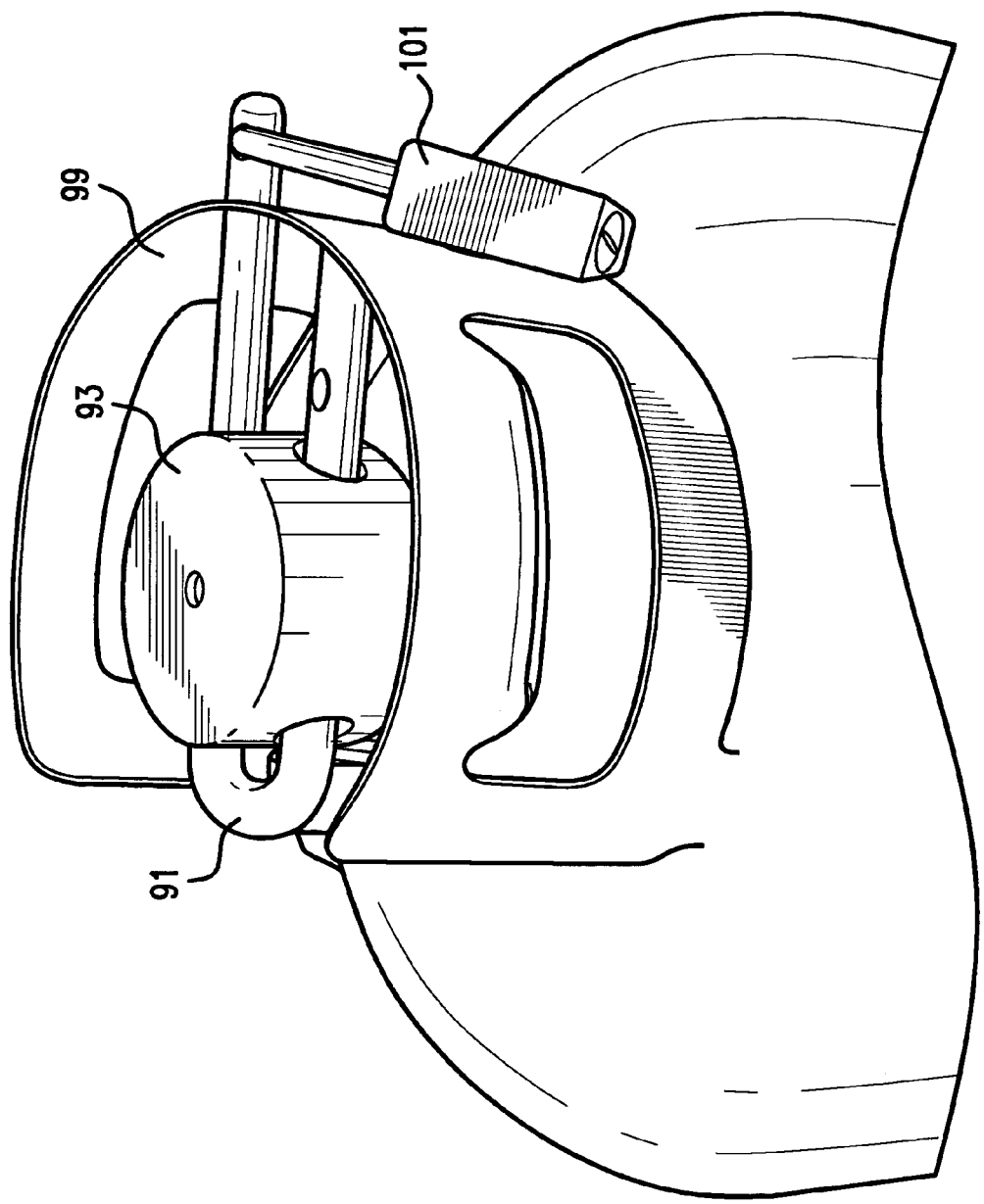

FIGS. 8 and 9 illustrate yet another embodiment of the present invention. This embodiment does not include a handle, but still prevents access to the valve of the propane tank. The device includes U-shaped member 91 and cup 93. As before, the cup fits over the valve of the tank. In this embodiment, the cup includes openings, such as opening 95, which allow the prongs of the U-shaped member to slide through the cup. The U-shaped member includes at least one hole 97. In the embodiment shown, there are two such holes, located on both prongs of the member. Also, the prongs are of unequal length, and one of the prongs is long enough to extend beyond the periphery of the collar 99 when the U-shaped member is fully inserted into the cup. The hole in the longer prong is located near the end of that prong, while the hole in the shorter prong is spaced away from the end.

The U-shaped member 91 therefore slides through the cup 93. The prongs of the U-shaped member slide below the valve. The valve is not visible in FIGS. 8 and 9, but is similar in structure to that shown in FIGS. 2 and 6. The shank of padlock 101 can then be inserted through the hole in the long prong, as shown in FIG. 9. In this arrangement, the U-shaped member is locked in place, and prevents movement of the cup 93. The cup cannot be lifted off the valve because the prongs of the U-shaped member are positioned under the knob of the valve, and are therefore blocked by the knob. Thus, the U-shaped member cannot be moved upward. Since the cup is constrained by the U-shaped member, the cup also cannot move away from the valve, and access to the valve is again blocked.

In an alternative arrangement, one could insert the shank of the lock through the hole in the shorter prong, which is located inside the region bounded by the collar. In this case also, affixing the padlock prevents significant movement of the U-shaped member, and prevents removal of the cup. Access to the valve inside the cup is still blocked.

FIG. 9 shows the reason for the spacing of the holes 97 in the prongs of the U-shaped member. When the U-shaped member is fully inserted, the hole of the longer prong extends just beyond the collar, and the hole of the shorter prong extends just beyond the cup. Affixation of the lock to either of these holes will have the desired effect. It is also possible to affix two separate locks, to both holes, to increase the degree of security.

An important advantage of all embodiments of the present invention is that they can be used with existing propane tanks, and do not require modification of such tanks. The device of the present invention does not require any drilling of holes in any part of the tank, or any change to the existing valve structure. It simply provides means for covering the valve with a cup, and for preventing the cup from being moved away from the valve.

The invention can be modified in various ways, as will be apparent to those skilled in the art. For example, different means of attachment of the cup to the cross-member can be used. The cup could be welded to the cross-member, or it could be attached by a screw and nut, as suggested in the embodiment of FIGS. 6 and 7. In another alternative, the cup could be allowed to slide, through a limited range, along a slit in the cross-member, thereby allowing the cup to be correctly positioned over the valve in cases where the valve is not perfectly centered on the tank. These and other modifications should be considered within the spirit and scope of the following claims.

What is claimed is:

1. A safety device for a propane tank, the tank including a gas valve and a collar, the device comprising:
   a) a cup, the cup having a size sufficient to enclose a substantial portion of the valve, and
   b) means for locking the cup in place over the valve, wherein the locking means, in a locked position, prevents access to the valve,
   wherein the locking means includes a cross-member and a handle portion,
   wherein the cross-member and handle portion are distinct, wherein the handle portion is distinct from the cup, and wherein the handle portion is insertable into an opening formed in the cross-member.

2. A safety device for a propane tank, the tank including a gas valve and a collar, the device comprising:
   a) a cup, the cup having a size sufficient to enclose a substantial portion of the valve, and
   b) means for locking the cup in place over the valve, wherein the locking means, in a locked position, prevents access to the valve,
   wherein the locking means includes a cross-member and a handle portion,
   wherein the cross-member and handle portion are distinct, and wherein the handle portion is insertable into an opening formed in the cross-member, and
   wherein both the cross-member and handle portion include means for engaging the collar.

3. The safety device of claim 2, wherein the cross-member includes a pair of spaced-apart baffles, the baffles having mutually-aligned holes, wherein the holes are spaced sufficiently away from a main body of the cross-member to enable a part of the handle to rest below a level of the holes.

4. The safety device of claim 3, further comprising a padlock having a shank, the shank being insertable through the holes of the baffles.

5. A safety device for a propane tank, the tank including a gas valve and a collar, the device comprising:
   a) a cup, the cup having a size sufficient to enclose a substantial portion of the valve, and
   b) means for locking the cup in place over the valve, wherein the locking means, in a locked position, prevents access to the valve,
   wherein the locking means includes a cross-member and a handle portion,
   wherein the handle portion is permanently affixed to the cross-member.

6. The safety device of claim 5, wherein the cross-member is affixed to the cup.

7. The safety device of claim 6, wherein the cross-member has two ends, and wherein the cross-member includes means, at both of said two ends, for engaging the cross-member with the collar of the tank.

8. The safety device of claim 7, wherein one of the engaging means comprises a generally C-shaped member.

9. The safety device of claim 7, wherein one of the engaging means comprises a pair of generally spaced-apart parallel members, the parallel members being sized to fit around a portion of the collar, the parallel members including mutually aligned holes for accommodating a shank of a lock.

10. A safety device for a propane tank, the tank including a gas valve and a collar, the device comprising:
    a) a cup, the cup having a size sufficient to enclose a substantial portion of the valve, and
    b) means for locking the cup in place over the valve, wherein the locking means, in a locked position, prevents access to the valve,
    wherein the locking means includes a cross-member and a handle portion,
    wherein the cross-member and handle portion comprise a unitary structure.

11. The safety device of claim 10, wherein the cross-member includes means for engaging the collar at diametrically opposed locations.

12. The safety device of claim 11, wherein one of the engaging means includes an L-shaped structure having a hole which accommodates a shank of a padlock.

13. The safety device of claim 11, wherein the cup is affixed to the cross-member.

14. A safety device for a propane tank, the tank including a gas valve and a collar, the device comprising:
    a) a cup, the cup having a size sufficient to enclose a substantial portion of the valve, and
    b) means for locking the cup in place over the valve, wherein the locking means, in a locked position, prevents access to the valve,
    wherein the locking means includes a U-shaped member insertable through at least one opening formed in the cup, and means for locking the U-shaped member in position after the U-shaped member has been inserted through the cup.

15. The safety device of claim 14, wherein the U-shaped member has two prongs, wherein a first of said prongs is longer than a second of said prongs, wherein said first prong is sufficiently long to extend beyond the collar when said first prong is inserted through the cup, wherein said first prong includes a hole which accommodates a shank of a padlock.

16. The safety device of claim 15, wherein said second prong has a hole, and wherein the hole of said second prong is spaced-apart from an end of said second prong.

17. A method of securing a propane tank, the tank having a valve, the method comprising the steps of:
   a) covering the valve with a cup-shaped member, and
   b) locking the cup in place so that the cup cannot be readily dislodged from the valve, and so that access to the valve is blocked,
   wherein the cup-shaped member is attached to a cross-member, and wherein the covering step comprises positioning the cross-member over the valve, and wherein the locking step comprises threading a handle portion through an opening in the cross-member and locking the handle portion to the cross-member.

18. A method of securing a propane tank, the tank having a valve, the method comprising the steps of:
   a) covering the valve with a cup-shaped member, and
   b) locking the cup in place so that the cup cannot be readily dislodged from the valve, and so that access to the valve is blocked,
   wherein the tank has a collar, and wherein the cup-shaped member is attached to a cross-member having two ends, the cross-member having means for engagement of the cross-member, at both of its ends, to the collar, and wherein the covering step comprises positioning the cross-member such that the cup covers the valve and such that the ends of the cross-member engage the collar, and wherein the locking step comprises locking one of the ends of the cross-member to the collar.

19. A method of securing a propane tank, the tank having a valve, the method comprising the steps of:
   a) covering the valve with a cup-shaped member, and
   b) locking the cup in place so that the cup cannot be readily dislodged from the valve, and so that access to the valve is blocked,
   wherein the tank has a collar, and wherein the locking step comprises threading a U-shaped member through holes in the cup, and locking the U-shaped member to the collar so as to prevent movement of the cup-shaped member.

* * * * *